United States Patent [19]
Gilbert

[11] 4,000,846
[45] Jan. 4, 1977

[54] PRESSURE RELIEF VALVE AND BAG INCORPORATING SAME

[75] Inventor: Seymour Gilbert, Piscataway, N.J.

[73] Assignee: Dunkin Donuts Incorporated, Randolph, Mass.

[22] Filed: June 30, 1975

[21] Appl. No.: 591,508

[52] U.S. Cl. .............................. 229/62.5; 137/859; 220/209; 426/118

[51] Int. Cl.² ......................................... B65D 31/14

[58] Field of Search ........... 137/525; 426/118, 130, 426/395, 8; 220/209; 229/62.5; 150/9

[56] References Cited

UNITED STATES PATENTS

| | | | |
|---|---|---|---|
| 2,870,954 | 1/1959 | Kulesza | 426/118 X |
| 3,197,119 | 7/1965 | Hartig et al. | 229/62.5 |
| 3,401,719 | 9/1968 | Rosser | 137/525 |
| 3,424,343 | 1/1969 | Hoeffelman | 220/67 |
| 3,595,467 | 7/1971 | Goglio | 137/525 |

FOREIGN PATENTS OR APPLICATIONS

| 414,284 | 8/1934 | United Kingdom | 220/209 |
|---|---|---|---|

Primary Examiner—Stephen P. Garbe
Attorney, Agent, or Firm—Lerner, David, Littenberg & Samuel

[57] ABSTRACT

A highly improved pressure relief valve permitting release of pressure from an enclosed area without permitting any substantial reverse flow of gases or fluids into that enclosed area is disclosed. Specifically, the pressure relief valve includes a rigid base member, preferably composed of a rigid plastic material such as polyvinyl chloride, a flexible valve membrane stretched across the surface of the base member, the flexible valve membrane preferably composed of a synthetic resin material, and an entrance port associated with one end of the base member so that pressure build-up in the enclosed area is released between the base member and the flexible valve membrane when it reaches a predetermined level. Furthermore, a coffee bag for storing roasted coffee beans and ground coffee is disclosed, including the above-described pressure relief valve for permitting the release of $CO_2$ from the bag while at the same time preventing the entrance of any substantial amounts of $O_2$ into the bag.

14 Claims, 6 Drawing Figures

PRESSURE RELIEF VALVE AND BAG INCORPORATING SAME

FIELD OF THE INVENTION

The present invention relates to pressure relief valves for permitting the release of pressure from an enclosed area after the pressure reaches a predetermined level. More specifically, the present invention relates to pressure relief valves capable of extremely fine control of pressure within an enclosed area. Still more specifically, the present invention relates to one-way pressure relief valves which permit careful control of pressure within an enclosed area without permitting the entrance of any significannt amounts of fluids and/or gases into the enclosed area.

The present invention also relates to coffee bags including pressure relief valves. More specifically, the present invention also relates to coffee bags for the storage of roasted coffee beans or ground coffee so that extremely fine control of the $CO_2$ pressure within the coffee bag is maintained without permitting the entrance of any significant amounts of $O_2$ into the bag.

BACKGROUND OF THE INVENTION

It has been known for many years to employ one-way pressure relief valves in order to maintain the pressure within closed containers within certain fixed ranges. That is, such one-way valves are employed so that when the pressure within the enclosed area reaches a predetermined level, the valve permits pressure release therefrom, at least until the aforementioned predetermined pressure range is re-established. Specifically, U.S. Pat. No. 2,429,984 to Berglund teaches a valve which permits gas to vent from a container when that pressure is sufficient to overcome the preloading of a rubber valve as it is lifted from the surface of the container. The valve of Berglund thus permits pressure release upon overcoming the initial tension in the rubber, or its preloading. Furthermore, U.S. Pat. No. 3,528,342 to Simcock teaches a similar type of pressure relief valve loaded by a domed resilient diaphragm which acts on the valve closure member through a deformable member or pad. The diaphragm thus maintains the pad in a closed position until the pressure is sufficient to move the pad upwardly.

Various other pressure relief valves are also known, including that of U.S. Pat. No. 3,804,113 to Garcea, teaching a non-return valve including a yieldable diaphragm made of an elastomer or rubber, and U.S. Pat. No. 3,258,028 to Donner, which teaches the use of a rubber valve element whose open end can be moved up upon overcoming its natural resiliency. While each of these patents thus discloses pressure relief valves for use under various circumstances and conditions, the search has continued for such pressure relief valves which are capable of much finer degrees of pressure control, particularly in the area of $CO_2$ release from coffee bags.

The latter application of pressure relief valves has presented a particularly difficult problem in view of the fact that extremely fine pressure control is required so that the normally thin coffee bags do not burst, while at the same time reverse flow is substantially prevented so that oxygen and other gases do not enter the coffee bag to attack the roasted coffee therein. An attempt has been made to overcome this particularly difficult application of pressure relief valves in U.S. Pat. No. 3,595,467 to Goglio. This patent teaches a valve for use in coffee bags specifically, including a rubber disc biased in a closed position by external pressure, which disc permits pressure release from within the bag only when sufficient pressure is exerted so that the peripheral portion of the disc is permitted to lift. A rubber disc is taught by the patentee for such use. Again, however, the use of such valves has not proven commercially acceptable, particularly in view of the fact that such valves do not accomplish the fine control of pressure within the coffee bag itself which is necessary in such applications. The search for a more practical pressure relief valve for use in such applications has therefore continued. With respect to such an application, i.e., particularly with respect to coffee bags, the need for such a valve relates to the fact that the coffee is best preserved by isolation from the external environment, i.e., minimum contact with air and oxygen, in order to avoid oxidation whereby the coffee itself would deteriorate in its flavor and aroma characteristics. On the other hand, coffee includes a substantial amount of gases, such as $CO_2$, which build up within the coffee beans during roasting, and which slowly escapes therefrom during storage. If no means is provided for relieving this pressure, the coffee bag can easily rupture.

SUMMARY OF THE INVENTION

According to the present invention, it has now been discovered that a highly improved pressure relief valve for obtaining the extremely fine control of the pressure within an enclosed area, and for permitting the release of pressure from such an enclosed area without permitting any substantial reverse flow into the enclosed area, may be prepared from a rigid base member, a flexible valve membrane stretched across the surface of the base member, and an entrance port associated with one end of the base member, so that the entrance port is in communication with the source of pressure to be controlled, and further so that when the source of pressure reaches a predetermined level, pressure is released therefrom between the base member and the flexible valve membrane by forcing the membrane apart from the base member.

In one embodiment of the present invention, a coffee bag is disclosed including the above-described pressure relief valve, the coffee bag preferably comprising a multi-layered outer structure, and a sealed seam thereabout.

In a preferred embodiment of the pressure relief valve of the present invention, the surface area of the flexible valve membrane is at least 500 times the displacement required to obtain a flow of the gas from said enclosed area.

In a highly preferred embodiment of the pressure relief valve of the present invention, the rigid base member has an arched configuration, and the flexible valve membrane is stretched taught across the arched base member. Preferably, the stretched flexible valve membrane will have a tensile strength of at least about 1,500 pounds per square inch, and an elongation of at least about 300%.

In another embodiment of the pressure relief valve of the present invention, the flexible valve membrane comprises a synthetic resin, such as a polyester resin, or a metal foil, such as aluminum foil, stretched across the surface of the rigid base member. Additionally, the flexible valve membrane will be relatively non-permeable with respect to the particular fluid or gas whose pressure is to be regulated.

In yet another preferred embodiment of the present invention, the rigid base member will preferably be prepared from plastic, preferably polyvinyl chloride, and will include an arched arcuate configuration across whose surface the flexible valve membrane will be stretched.

These and other significant features of the present invention will be more apparent from the following description relative to the accompanying drawings, as follows:

DETAILED DESCRIPTION

Figure 1:
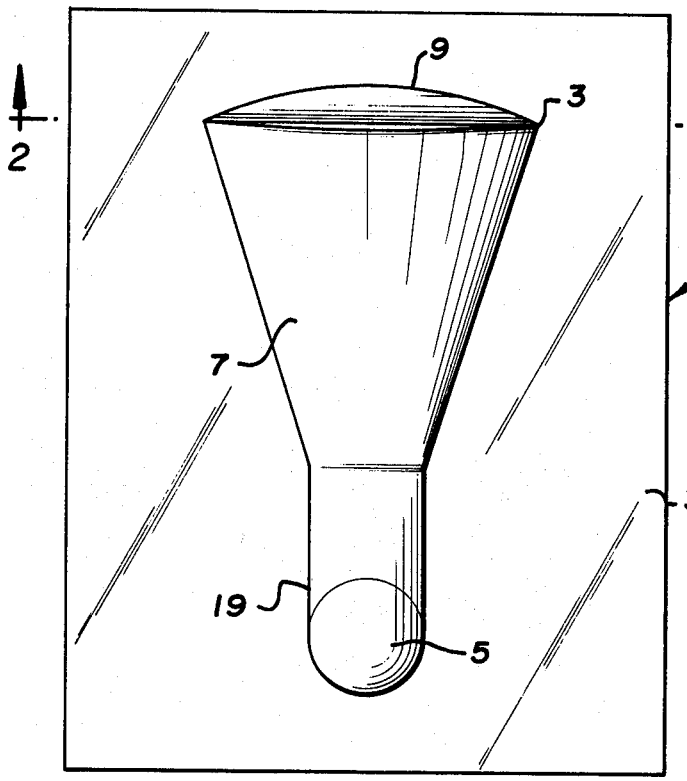
FIG. 1 is a top elevational perspective view of the base member of the pressure relief valve of the present invention.

As shown in the drawings, in which like numerals refer to like parts thereof, the pressure relief valve 1 of the present invention includes a rigid base member 3. The rigid base member 3 may be prepared from any rigid material which can be chosen so as not to be effected by the particular fluid or gas whose pressure is to be regulated thereby. Preferably, a plastic material will be preferred, such as polyvinyl chloride and the like, although other said rigid base members will become apparent to those skilled in this art.

Figure 2:
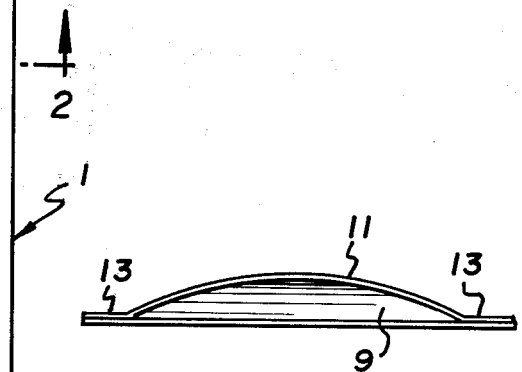
FIG. 2 is a front sectional elevational view of the rigid base member and flexible valve membrane of the present invention taken along lines 2—2 of FIG. 4.

The rigid base member 3 includes a sloping, arcuate raised portion 7, which is generally semi-conical in configuration, terminating at its narrow end with a narrow neck portion 19, which may also be slightly arched, and a circular opening 5. At its wider end 33, this raised arcuate portion terminates in a transverse wall portion 9, as can best be seen in FIG. 2. The rigid base member 3 may thus be prepared from a single sheet of the base material, such as polyvinyl chloride, and from which the afore-described raised arcuate portion may be molded, or otherwise prepared by methods well known to those skilled in this art.

Figure 3:
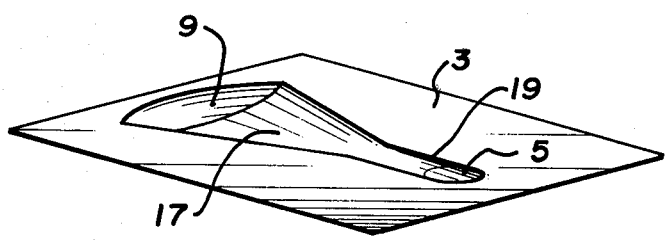
FIG. 3 is a bottom perspective view of the rigid base member of the pressure relief valve of the present invention.

As can best be seen from FIG. 3, the underside of the rigid base member 3 thus includes a depressed portion 17 corresponding to the raised portion 7, again having an arcuate, concave surface, as compared to the corresponding convex surface on the upper portion of the arcuate region 7.

Figure 4:
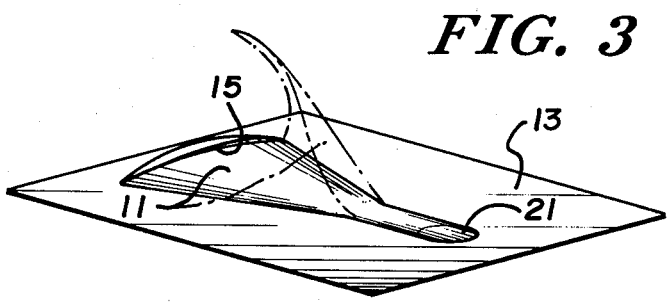
FIG. 4 is a top perspective view of the pressure relief valve of the present invention.

As is shown in FIG. 4, the completed pressure relief valve of the present invention includes the rigid base member 3 covered by the flexible valve membrane 11. The flexible valve membrane 11 is thus prepared from a thin, flexible sheet of a non-rigid material which is stretched across the face of the convex arcuate region 7 of the rigid base member 3, and affixed to the planar or flat portion of the rigid base member 3 surrounding the arcuate raised portion 7 such as by lamination, or other heat-sealing procedures. In this manner, the entire surface of the rigid base member 3 is covered by the flexible valve membrane, but the two layers are actually adhered to each other in that portion of the rigid base member 3 designated 13 in FIG. 4, while over the arcuate raised portion of the rigid base member 3, the flexible valve membrane is merely in a stretched configuration. In this manner, the circular opening 5 is also covered by the stretched valve membrane 21 to therefore seal the top portion of the relief valve from the lower portion thereof, which will be in communication with the area whose pressure is to be regulated.

Furthermore, the flexible valve membrane 11 is provided with a narrow slit 15 preferably located at the wider, raised arcuate portion of the rigid base member 3, i.e., at the transverse wall portion 9.

In this manner, in its closed configuration, the stretched flexible valve membrane 11 completely seals the inner portion or enclosed area whose pressure is to be regulated. On the other hand, when the pressure within that area increases beyond a predetermined amount, this pressure is exerted through opening 5, against the stretched flexible valve membrane 11, until the pressure becomes great enough to force the flexible valve membrane 11 to be displaced from the surface of the arcuate raised portion of the rigid base member 3, and the gas or fluid is released along the length of the raised arcuate portion and through the slit 15 in the flexible valve membrane 11. As soon as the pressure is reduced, the pressure is no longer sufficient to force the flexible valve membrane 11 away from the surface of the rigid base member 3, so that the flexible valve membrane 11 again seals opening 5, and simultaneously prevents the entrance of any substantial gas or other foreign matter located outside of the valve from entering slit 15 and opening 5.

It has therefore been discovered that in this manner, fine control of the pressure maintained within an enclosed area can be effected.

The configuration of the pressure relief valve described above has been found to be particularly advantageous for such purposes. This is believed to be based, at least in part, upon the fact that for a very slight displacement of the flexible valve membrane from the surface of the rigid base member, an appreciable flow can occur through the valve, as a result of the very large effective surface area of the flexible valve membrane. That is, it is particularly preferred that the surface area of the flexible valve membrane stretched across the face of the rigid base member be at least 500 times the maximum displacement of the flexible valve membrane at any point thereon (i.e., from the surface of the rigid base member) which is required to produce a flow of at least 50 mm$^3$/second of gas or fluid through the valve. More preferably, the surface area will be at least 750 times the displacement required for such a flow and most preferably at least 1,000 times.

Furthermore, the properties of the materials employed in the flexible valve membrane are of particular significance. A low density polyethylene has been found to be particularly advantageous, as is saran (polyvinylidene chloride). It is thus preferred that these materials have a tensile strength of at least 1,500 lbs/in$^2$, preferably at least 2,000 lbs/in$^2$, and most preferably at least 3,000 lbs/in$^2$, as well as an elongation of at least about 300%, where polyethylene is employed, preferably 500%, and at least above 15% when saran is employed, preferably 25%.

Figure 5:
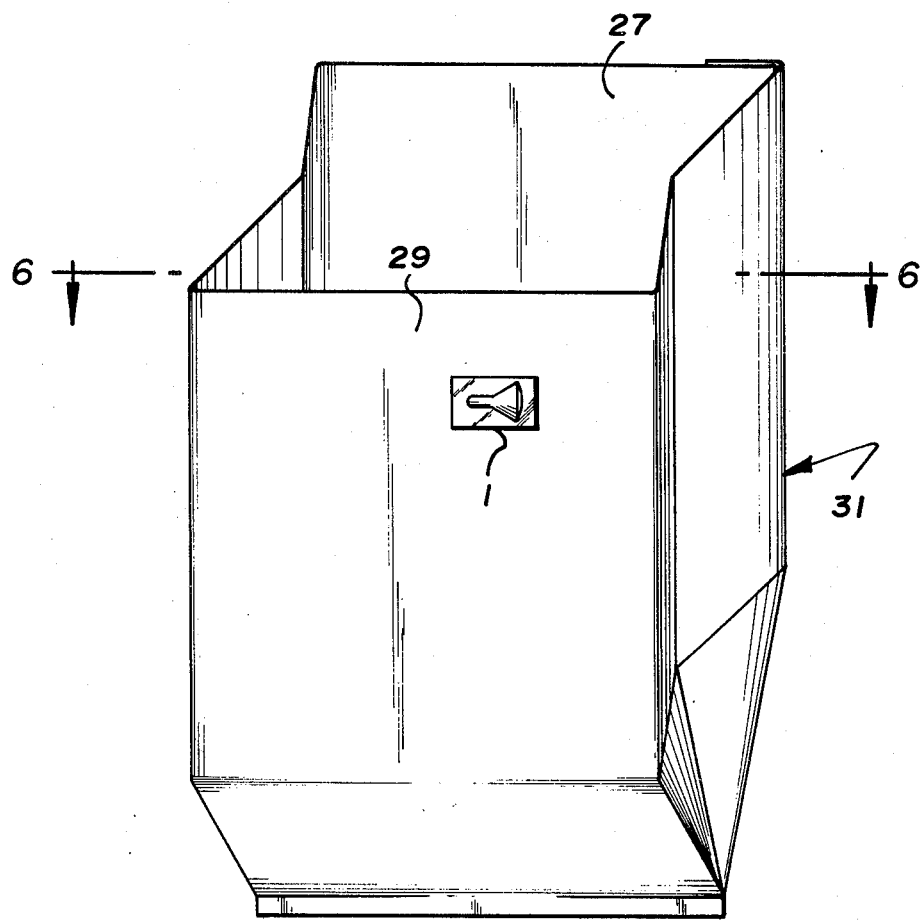
FIG. 5 is a front elevational view of a coffee bag according to the present invention, including the pressure relief valve thereof.
Figure 6:
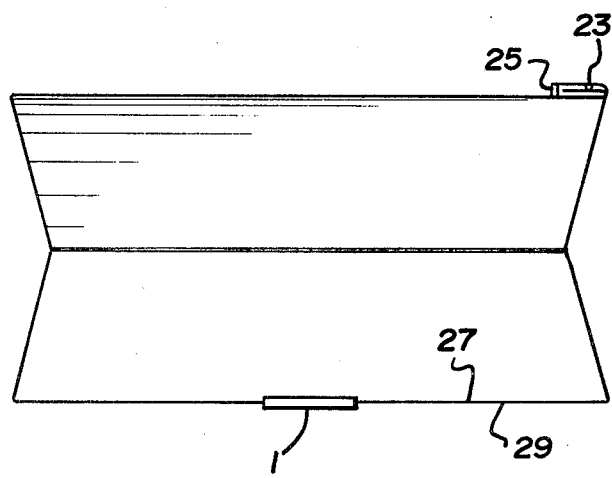
FIG. 6 is a top sectional elevational view of the coffee bag of the present invention including the pressure relief valve hereof taken along lines 6—6 of FIG. 5.

Referring now to FIGS. 5 and 6, a coffee bag of the present invention incorporating the above-described pressure relief valve 1 is shown. The flexible coffee bag itself is generally formed from a plurality of film laminates, the inner one of which is generally of a thermosealing material. In the embodiments shown in FIGS. 5 and 6, the container is made in the form of a bellows, wherein the seams are completely thermosealed. The inner surface of the coffee bag 31 is made of thermoplastic sheet materials and is designated 27, while the outer surface of same, preferably made of another material such as paper, is designated 29. The longitudinal weld line (See FIG. 6) is designated 23, and welding is accomplished on borders initially laterally projecting, whereupon the weld zone, suitably bent as shown in FIG. 6, is attached to the outer underlying surface 29, namely being adhered by a suitable adhesive as shown at 25. The bag 31 includes an opening corresponding with the circular opening 5 in the pressure relief valve 1 so that when the pressure relief valve 1 is attached to or incorporated in the surface of the coffee bag, the pressure relief described above may be effected through opening 5 and slit 15. In this embodiment when the roasted coffee beans or ground coffee is stored within the coffee bag 31, as discussed above, the $CO_2$ is released therefrom, the pressure built up within the sealed coffee bag 31 may be released by the pressure relief valve 1 in the manner described above.

It is believed, however, that the pressure relief valve 1, as described above, will have many additional applications wherein the extremely fine control of pressure built up within an enclosed area is desired, while preventing any reverse flow of any gas or fluids into that enclosed area.

What is claimed is:

1. A pressure relief valve for permitting the release of pressure from an enclosed area, without permitting substantial reverse flow into said enclosed area, which comprises a rigid base member including a raised portion, a flexible valve membrane stretched across the surface of said base member, said flexible valve membrane including a surface area of at least 500 times the maximum displacement of said flexible valve membrane at any point thereon which is required to obtain a flow through said valve, said flexible valve membrane further including slot means located in the portion of said flexible valve membrane stretched across the raised portion of said rigid base member, and an entrance port associated with one end of said base member, said raised portion of said base member and said slot means being distal from said entrance port, said entrance port adapted to be in communication with the source of pressure to be controlled, so that when said source of pressure reaches a predetermined level, said pressure is released between said base member and said valve membrane by causing said valve membrane to be displaced from said base member.

2. The pressure relief valve of claim 1 wherein said flexible valve membrane comprises a synthetic resin.

3. The pressure relief valve of claim 2 wherein said synthetic resin comprises a polyester resin.

4. The pressure relief valve of claim 1 wherein said rigid base member comprises plastic.

5. The pressure relief valve of claim 1 wherein said raised portion of said rigid base member is arcuate.

6. The pressure relief valve of claim 5 wherein said raised arcuate portion has a semi-conical surface, the narrow end of which is associated with said entrance port.

7. The pressure relief valve of claim 1 wherein said flexible valve membrane comprises a metallic foil.

8. A coffee bag including a pressure relief valve for permitting the release of $CO_2$ from roasted coffee beans or ground coffee contained within said coffee bag, while substantially preventing the entrance of $O_2$ thereinto, said pressure relief valve comprising a rigid base member including a raised portion, a flexible valve membrane stretched across the surface of said rigid base member, said flexible valve membrane having a surface area of at least 500 times the maximum displacement of said flexible valve membrane at any point thereon which is required to obtain a flow through said valve, said flexible valve membrane further including slot means located in the portion of said flexible valve membrane stretched across said raised portion of said rigid base member, and an entrance port associated with one end of said rigid base member, said raised portion of said rigid base member being distal from said entrance port, said entrance port being in communication with a source of pressure to be controlled, so that when said source of pressure reaches a predetermined level, said pressure is released between said rigid base member and said valve membrane by forcing said valve membrane apart from said base member.

9. The coffee bag of claim 8 wherein said flexible valve membrane comprises a synthetic resin.

10. The coffee bag of claim 8 wherein said rigid base member of said pressure relief valve comprises plastic.

11. The coffee bag of claim 8 wherein said raised portion of said rigid base member includes an arched arcuate portion, and an unarched surface, and said flexible valve membrane is stretched across said arched arcuate portion.

12. The coffee bag of claim 11 wherein the flexible valve membrane of said pressure relief valve is adhered to the unarched surface of said valve.

13. The pressure relief valve of claim 1 wherein said flexible valve membrane has an elongation of at least 300%.

14. The coffee bag of claim 8 wherein said flexible valve membrane has an elongation of at least about 300%.

* * * * *